United States Patent
Inanlou

(10) Patent No.: US 11,378,680 B2
(45) Date of Patent: Jul. 5, 2022

(54) MILLIMETER-WAVE RADAR IMAGING DEVICE AND METHOD

(71) Applicant: Palo Alto Research Center Incorporated, Palo Alto, CA (US)

(72) Inventor: Farzad Michael David Inanlou, Redwood City, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 288 days.

(21) Appl. No.: 16/795,068

(22) Filed: Feb. 19, 2020

(65) Prior Publication Data
US 2021/0255313 A1   Aug. 19, 2021

(51) Int. Cl.
| G01S 13/89 | (2006.01) |
| G01S 13/75 | (2006.01) |
| G01S 13/86 | (2006.01) |
| H04B 5/00  | (2006.01) |

(52) U.S. Cl.
CPC .......... *G01S 13/89* (2013.01); *G01S 13/751* (2013.01); *G01S 13/867* (2013.01); *H04B 5/0062* (2013.01)

(58) Field of Classification Search
CPC ...... G01S 13/89; G01S 13/751; G01S 13/867; H04B 5/0062
See application file for complete search history.

(56) References Cited

U.S. PATENT DOCUMENTS

| 9,035,774 B2 | 5/2015 | Scott et al. |
| 9,129,332 B1* | 9/2015 | Oakes, III .......... G06Q 30/0639 |
| 9,316,732 B1* | 4/2016 | Mohamadi .......... G01S 13/0209 |

(Continued)

FOREIGN PATENT DOCUMENTS

| WO | 2007/102142 | 9/2007 | |
| WO | WO-2007102142 A1 * | 9/2007 | ....... G06K 19/06037 |

(Continued)

OTHER PUBLICATIONS

EP Search Report from EP Application No. 21155343.3 dated Jul. 16, 2021, 8 pages.

(Continued)

*Primary Examiner* — Vladimir Magloire
*Assistant Examiner* — Nazra Nur Waheed
(74) *Attorney, Agent, or Firm* — Mueting Raasch Group

(57) ABSTRACT

A millimeter-wave (mmW) imaging system comprises a mmW source configured to transmit mmW radiation to a target and a mmW imaging device. The mmW imaging device comprises an array of up-converter elements configured to convert backscatter radiation received from the target directly to visible light. The up-converter array has a first surface and a second surface. The mmW imaging device also comprises a first focusing lens optically coupled to the first surface of the up-converter array and configured to direct backscatter radiation received from the target to the up-converter elements. The mmW imaging device further comprises an an array of photodetectors. The photodetector array has a first surface and a second surface. The first surface of the photodetector array is configured to receive visible light emitted by the up-converter elements. The photodetector array is configured to produce electrical signals indicative of an optical image of the target.

15 Claims, 5 Drawing Sheets

(56) References Cited

U.S. PATENT DOCUMENTS

| | | | |
|---|---|---|---|
| 9,638,787 B2 | 5/2017 | Chua et al. | |
| 9,904,824 B2 | 2/2018 | Karmakar et al. | |
| 10,677,713 B1 * | 6/2020 | Yap | G01N 21/39 |
| 2008/0293008 A1 * | 11/2008 | Regere | A61C 17/20 |
| | | | 433/119 |
| 2009/0040025 A1 | 2/2009 | Volpi et al. | |
| 2015/0097743 A1 * | 4/2015 | Evans | H01Q 1/427 |
| | | | 343/754 |
| 2018/0356625 A1 * | 12/2018 | Conley | H01L 31/1035 |
| 2019/0154439 A1 * | 5/2019 | Binder | G01S 13/878 |
| 2019/0293751 A1 | 9/2019 | Abarra | |
| 2020/0049455 A1 * | 2/2020 | Hamilton | G02B 23/04 |
| 2021/0293931 A1 * | 9/2021 | Nemet | G01S 7/4808 |

FOREIGN PATENT DOCUMENTS

| | | | |
|---|---|---|---|
| WO | WO-2016016663 A2 * | 2/2016 | G01B 7/06 |
| WO | 2018/015949 | 1/2018 | |
| WO | WO-2018015949 A1 * | 1/2018 | G01J 3/42 |
| WO | 2018/147929 | 8/2018 | |
| WO | 2018/218313 | 12/2018 | |

OTHER PUBLICATIONS

Abramovich et al., "Super resolution and optical properties of THz double row array based on inexpensive Glow Discharge Detector (GDD) pixels", Millimetre Wave and Terahertz Sensors and Technology IV, SPIE, Oct. 6, 2011, pp. 1-7.

Barbot et al., "Accurate Positioning System Based on Chipless Technology", Sensors 2019, 19, 1341, 12 pages.

Watts et al., "2D and 3D Millimeter-Wave Synthetic Aperture Radar Imaging on a PR2 Platform", 2016 IEEE/RSJ International Conference on Intelligent Robots and Systems, 7 pages.

* cited by examiner

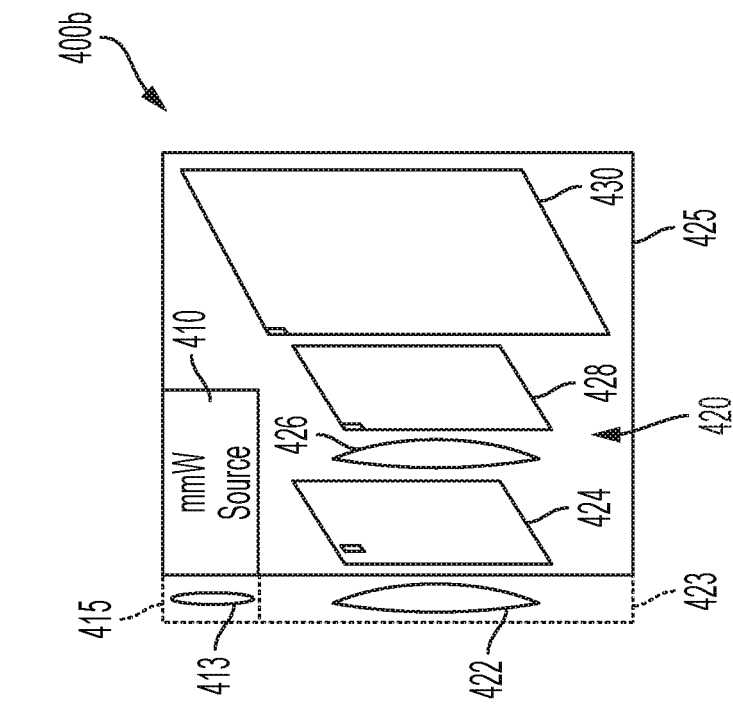
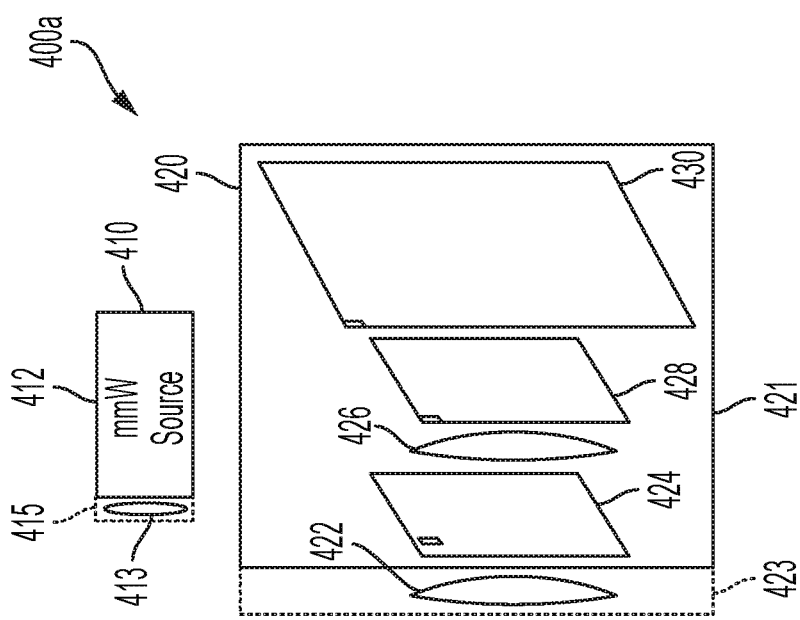

MILLIMETER-WAVE RADAR IMAGING DEVICE AND METHOD

TECHNICAL FIELD

This application relates generally to imaging devices and methods, including those that employ millimeter-wave radar sensors and target image reconstruction techniques.

BACKGROUND

Millimeter-wave (mmW) imaging of a target using conventional techniques (e.g., synthetic aperture radar or SAR, multiple-input-multiple-output or MIMO) typically involves scanning the target and processing the scan data using a digital signal processor (DSP). Conventional approaches to processing mmW scan data are computationally intensive and require powerful DSPs. Consequently, conventional systems that provide mmW imaging of a target are complex, expensive, and often limited in terms of portability and hand-held manipulation.

SUMMARY

Embodiments are directed to a millimeter-wave (mmW) imaging system comprising a mmW source configured to transmit mmW radiation to a target and a mmW imaging device. The mmW imaging device comprises an array of up-converter elements configured to convert backscatter radiation received from the target directly to visible light. The up-converter array has a first surface and a second surface. The mmW imaging device also comprises a first focusing lens optically coupled to the first surface of the up-converter array and configured to direct backscatter radiation received from the target to the up-converter elements. The mmW imaging device further comprises an an array of photodetectors. The photodetector array has a first surface and a second surface. The first surface of the photodetector array is configured to receive visible light emitted by the up-converter elements. The photodetector array is configured to produce electrical signals indicative of an optical image of the target.

Embodiments are directed to a mmW imaging system comprising a mmW source configured to transmit mmW radiation to a target and a mmW imaging device. The mmW imaging device comprises a glow discharge device (GDD) comprising an array of GDD pixels. The glow discharge device has a first surface and a second surface. The mmW imaging device also comprises a first focusing lens disposed at or proximate the first surface of the glow discharge device and configured to direct backscatter radiation received from the target to the GDD pixels. The mmW imaging device further comprises an array of photodetectors, the photodetector array having a first surface and a second surface. The mmW imaging device comprises an optical lens disposed between the second surface of the GDD and the first surface of the photodetector array, the optical lens configured to direct light emitted by the GDD pixels to the array of photodetectors. The mmW imaging device can comprise a display, a decoder, or both a display and a decoder. The display comprises an array of display pixels coupled to the array of photodetectors, the display configured to convert electrical signals produced by the array of photodetectors to an optical image of the target. The decoder is coupled to the array of photodetectors and configured to decode data encoded in the target configured as an RFID tag.

Embodiments are directed to a method implemented by a millimeter-wave (mmW) imaging system. The method comprises transmitting, from a mmW source, mmW radiation to a target and receiving, by a mmW imaging device, backscatter radiation from the target. The method also comprises up-converting the received backscatter radiation directly to visible light. The method further comprises receiving the visible light by an array of optical-to-electrical converters. The method also comprises coupling an output from the optical-to-electrical converters to one or both of a display for displaying the target and a decoder for decoding data encoded in the target configured as a chipless RFID tag.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 4A illustrates a mmW imaging system which includes a mmW source and a mmW imaging device respectively disposed in separate housings in accordance with any of the embodiments disclosed herein;

FIG. 4B illustrates a mmW imaging system which includes a mmW source and a mmW imaging device integrated within a common housing in accordance with any of the embodiments disclosed herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments of the disclosure are directed to imaging systems and methods that use a mmW imaging device configured to receive a backscattered mmW signal from a target and a distributed array of receivers configured to up-convert the backscattered mmW signal directly to visible light. The array of receivers that up-converts the backscattered mmW signal directly to visible light is optically coupled to an optical-to-electrical converter configured to produce an electrical output indicative of an image of the target. Use of the array of receivers to up-convert backscattered mmW radiation directly to visible light advantageously obviates the need for powerful DSPs and sophisticated image processing due to the mmW up-converting receiver array which does not require scanning/movement to image a target.

In some embodiments, the electrical output indicative of the target image is communicated to a display, such as a large area display, configured to display a reconstructed image of the target. In other embodiments, the electrical output indicative of the target image is communicated to a decoder configured to decode data encoded in the target. In further embodiments, the electrical output indicative of the target image can be communicated to a display and a decoder.

Various types of targets are contemplated, including various objects, structures, and materials. Targets detected by an imaging system of the present disclosure include those that are separated from the imaging system by a barrier (e.g., a wall, luggage, clothing) which is substantially non-transmissive to visible light. Various types of information-containing targets are contemplated, including RFID tags (e.g., chipless RFID tags), in which case the imaging system includes a decoder for decoding data encoded in the information-containing targets.

Figure 1:
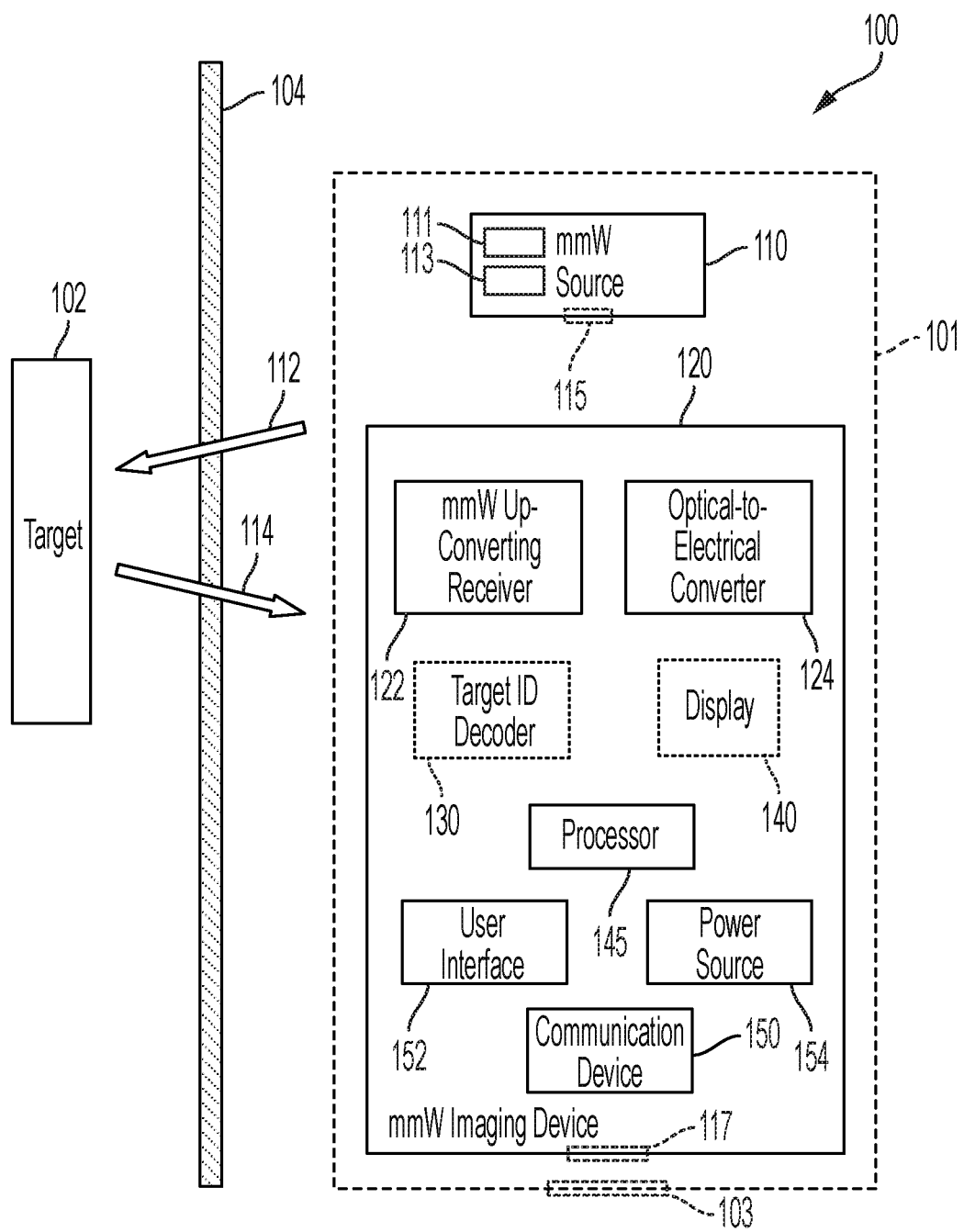
FIG. 1 is a block diagram of a mmW imaging system in accordance with any of the embodiments disclosed herein.

FIG. 1 is a block diagram of a mmW imaging system 100 in accordance with any of the embodiments disclosed herein. The mmW imaging system 100 includes a mmW source 110 and a mmW imaging device 120. In some embodiments, the mmW source 110 and the mmW imaging device 120 are components contained within or supported by a common housing 101. The housing 101, according to some embodiments, is configured for portability and hand-held manipulation by a user, e.g., similar to that of a conventional electronic stud finder. In other embodiments, the mmW source 110 and the mmW imaging device 120 are components contained or supported by separate housings. One or both of the separate housings of the mmW source 110 and the mmW imaging device 120 can be configured for portability and hand-held manipulation by the user.

The mmW imaging system 100 shown in FIG. 1 is configured to image a target 102. The target 102 can be any object, structure or material which can be detected using millimeter-wave imaging. For example, the target 102 can be an object, structure or material that is separated from the mmW imaging system 100 by a barrier 104 which is substantially non-transmissive to visible light (e.g., not viewable to the naked eye). The mmW imaging system 100 can be employed to image the target 102 separated from the mmW imaging system 100 by a wall, a garment, luggage, a backpack, a purse, a box or a container, for example. In some embodiments, the target 102 comprises an RFID tag, such as a chipless RFID tag. The mmW imaging system 100 can be employed to image the RFID tag and decode data encoded in the RFID tag.

According to various embodiments, the mmW imaging system 100 is configured to transmit and receive RF signals in the range from about 30 GHz to about 300 GHz (e.g., the EHF or Extremely High Frequency range). Radio waves in this spectrum have wavelengths from about 10 to 1 millimeter. As such, radiation in this frequency band is referred to as millimeter waves. The mmW imaging system 100 can implement millimeter-wave imaging for detection of objects, for example, as well as the range, velocity, and angle of these objects. Due to the use of RF signals with short wavelengths, the mmW imaging system 100 can provide sub-mm range accuracy and high resolution. The RF signals generated by the mmW imaging system 100 are able to penetrate various materials such as plastic, drywall, and clothing, and are impervious to environmental conditions such as rain, fog, dust and snow. The mmW imaging system 100 can be configured to be highly directional, such as by forming a compact beam with high angular accuracy. In some embodiments, the beam produced by the mmW imaging system 100 can be focused and steered using standard optical techniques. Although embodiments are directed to mmW imaging in this disclosure, it is understood that the imaging devices and methodologies disclosed herein can be implemented using RF signals that fall outside of the EHF range (e.g., the microwave band or terahertz band).

The mmW source 110 includes a radiofrequency (RF) transmitter 111 operatively coupled to an antenna 113. The mmW source 110 is configured to transmit mmW radiation 112 to the target 102. As was previously discussed, the target 102 may be separated from the mmW imaging system 100 by a barrier 104 to visible light. The mmW imaging device 120 is configured to receive and process backscatter radiation 114 from the target 102. The mmW imaging device 120 includes a mmW up-converting receiver 122 and an optical-to-electrical converter 124. In some embodiments, the mmW imaging device 120 can include a target ID detector 130 and/or a display 140. The target ID decoder 130 is configured to decode data encoded in the target 102, such as an RFID tag (e.g., chipless RFID tag). The display 140 is configured to display an image of the target 102 reconstructed by the mmW imaging device 120. In embodiments that include both a target ID decoder 130 and a display 140, data encoded in an RFID tag and decoded by the target ID decoder 130 can be presented on the display 140.

The mmW imaging system 100 can include a processor 145 configured to coordinate operations of the system 100. The processor 145 can be a component of the mmW imaging device 120. As was previously discussed, the mmW imaging device 120 need not include a powerful DSP and sophisticated image processing software since the mmW up-converting receiver 122 converts backscatter radiation received from the target 102 directly to visible light. According to embodiments that include the target ID decoder 130, the processor 145 can incorporate or be coupled to the target ID decoder 130.

The processor 145 can be implemented as or include one or more of a multi-core processor, a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 145 can include or be operatively coupled to memory, such as RAM, SRAM, ROM, or flash memory. The processor 145 can also be operatively coupled to a mass storage device, such as a solid-state drive (SSD).

As is further shown in FIG. 1, the mmW imaging system 100 can include a user interface 152 operatively coupled to the processor 145. The user interface 152 can include manually actuatable switches (e.g., push buttons, toggle switches, capacitive switches) and/or voice-activated controls. In some embodiments, the display 140 can be a component of the user interface 152 and be configured as a touch display. The mmW imaging system 100 also includes a power source 154, such as a conventional or rechargeable battery (e.g., lithium-ion battery) and/or a power converter for receiving power from a power line connection. The mmW imaging system 100 can include a communication device 150 configured to facilitate wired or wireless communication between the mmW imaging system 100 and an external system. For example, communication device 150 can incorporate a transceiver and an antenna configured to provide wireless communication in accordance with an IEEE 802.11 (e.g., WiFi®) or Bluetooth® (e.g., BLE, Bluetooth® 4.2, 5.0, 5.1, 5.2 or later) specification. The communication device 150 can incorporate a hardwired communication interface, such as a USB interface.

As was previously discussed, various embodiments of the mmW imaging system 100 can include a common housing 101 that contains and/or supports the mmW source 110 and the mmW imaging device 120. The common housing 101 can include a mounting coupler 103 configured to facilitate mounting of the mmW imaging system 100 on a support structure (e.g., a tripod, a structure fixture, a machine fixture). In other embodiments, the mmW source 110 and the mmW imaging device 120 can be contained and/or supported by separate housings, one or both of which can include a mounting coupler 115, 117.

Figures 2A, 2B:
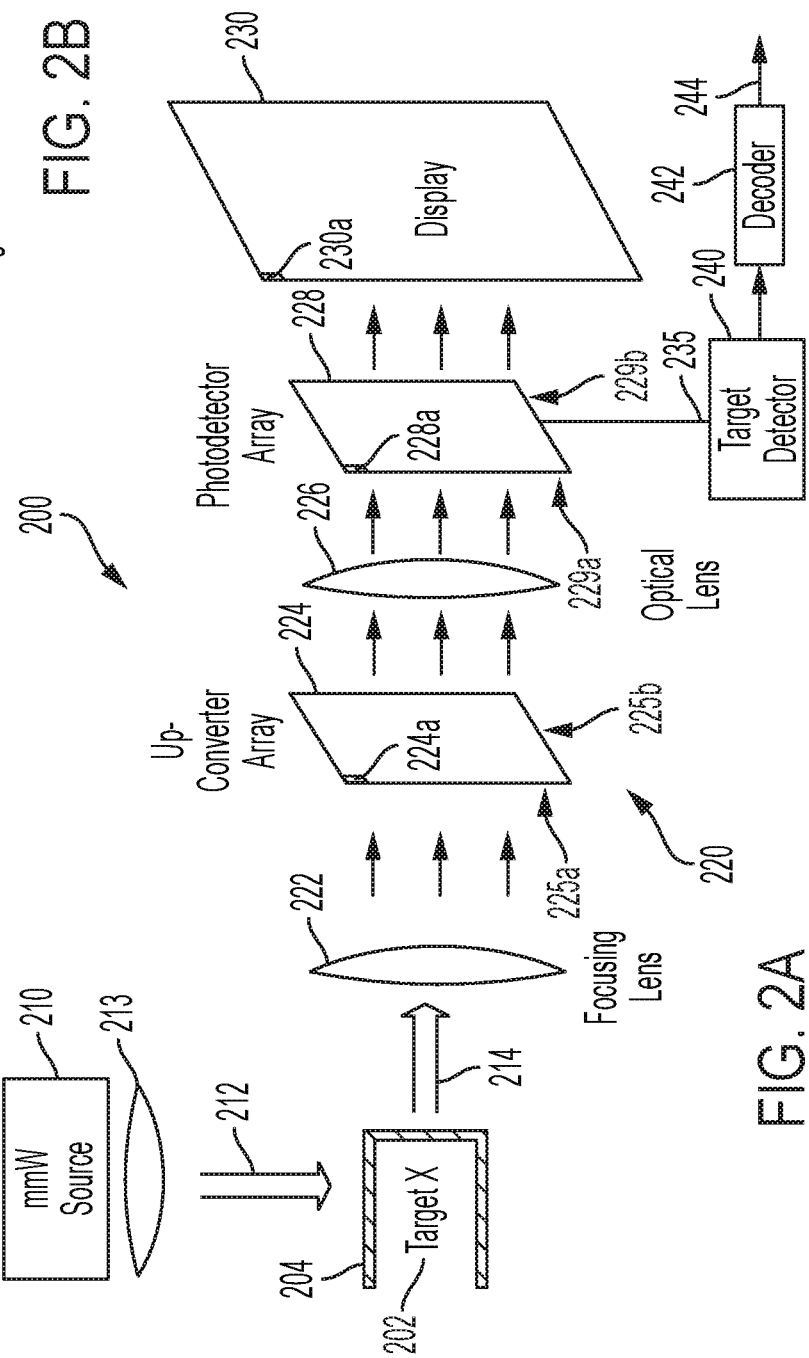
FIG. 2A is a block diagram of a mmW imaging system in accordance with any of the embodiments disclosed herein.
FIG. 2B is a block diagram of a mmW source and a mirror arrangement in accordance with any of the embodiments disclosed herein.

FIG. 2A illustrates a mmW imaging system 200 in accordance with any of the embodiments disclosed herein. The mmW imaging system 200 includes a mmW source 210 and a mmW imaging device 220. The mmW source 210 is configured to transmit mmW radiation 212 to a target 202. In some embodiments, and as shown in FIG. 2B, an apparatus that includes the mmW source 210 may also include a mirror arrangement 211 (e.g., a spherical mirror). The mirror arrangement 211 can be configured and arranged to direct mmW radiation 212 to the target 202. The target 202 may be separated from the mmW imaging system 200 by a barrier 204 which is substantially non-transmissive to visible light.

In some embodiments, a focusing lens 213 can be disposed at or proximate the mmW source 210 and configured to direct the mmW radiation at the target 202. The focusing lens 213 can be a dielectric lens (e.g., a dielectric lens antenna or a metal plate lens antenna) or a metamaterial lens. The focusing lens 213 can be configured to collimate mmW radiation generated by the mmW source 210 and direct the collimated mmW radiation to the target 202. For example, a spherical wavefront of mmW radiation produced by the mmW source 210 can be converted into a plane wavefront by the focusing lens 213.

The mmW imaging device 220 is configured to receive and process backscatter radiation 214 from the target 202. According to some embodiments, the mmW imaging device 220 includes an array 224 of up-converter elements 224a, a photodetector array 228 comprising an array of photodetector elements 228a, and a display 230 comprising an array of display pixels. In other embodiments, the mmW imaging device 220 includes the up-converter array 224 and the photodetector array 228, but excludes the display 230 (e.g., embodiments directed to detecting and decoding a target 202 in the form of an RFID tag, such as the chipless RFID tag shown in FIG. 3).

The up-converter elements 224a (e.g., up-converter pixels) of the up-converter array 224 are configured to convert backscatter radiation 214 received from the target 202 directly to visible light. The up-converter array 224 has a first surface 225a and a second surface 225b. The mmW imaging device 220 includes a focusing lens 222 optically coupled to the first surface of the up-converter array 224. The focusing lens 222 is configured to direct backscatter radiation 214 received from the target 202 to the up-converter elements 224a of the up-converter array 224. For example, the focusing lens 222 can be configured to collimate backscatter radiation 214 received from the target 220 and direct the collimated backscatter radiation to the up-converter array 224. The focusing lens 222 can be a dielectric lens or a metamaterial lens, which may be similar to focusing lens 213.

According to some embodiments, the up-converter array 224 is implemented as a glow discharge device (GDD) comprising an array of GDD pixels 224a. Each of the GDD pixels 224a emits visible light having an intensity which is linearly proportional to the incident mmW radiation 214 received by each GDD pixel 224a.

The photodetector array 228 is configured to capture an image of the visible light emitted by up-converter array 224. More particularly, the photodetector array 228 is configured to measure the visible light emitted from the up-converter array 224. The photodetector array 228 includes an array of photodetector elements 228a. In various embodiments, the photodetector array 228 comprises an array of optical-to-electrical converter elements.

The photodetector array 228 can be an active pixel sensor (APS), wherein each pixel sensor unit cell 228a includes a photodetector (e.g., a pinned photodiode) and one or more active transistors. For example, the photodetector array 228 can comprise a charge-couple device (CCD) or a complementary metal-oxide-semiconductor (CMOS) device (e.g., a CMOS camera) configured to capture an image of light emission from the GDD device 224. The photodetector array 228 can be a focal plane array (FPA), which can enable the photodetector array 228 to detect and simultaneously image the GDD pixels 224a. An image of the target 202 can be constructed according to the photodetector array's measurements of the light emission emitted by the up-converter array 224. The image provides an indication of the glow of the up-converter array 224, which is indicative of the mmW radiation 214 incident on the up-converter array 224.

In some embodiments, the photodetector array 228 can include or be coupled to an analog-to-digital converter (ADC) configured to convert each photodetector element's value into a digital value by measuring the amount of charge at each photosite and converting this measurement into binary form. For example, a variable electronic signal associated with each photodetector element 228a can be read out very rapidly as an intensity value for the corresponding image location. Following digitization of the intensity values, the image of the target 202 can be reconstructed. According to embodiments that include the display 230, the reconstructed image of the target 202 can be displayed on the display 230. The display 230 can be implemented as an LED/LCD display, an OLED display, or a microLED display, for example. The display 230 may be a touch display. The display 230 may be similar in size to a smartphone display or an Ipad® display, for example. In some embodiments, the display 230 is configured to produce motion video representative of real-time or near-real-time processing of target image data by the up-converter array 224 and the photodetector array 228. For example, the display 230 can incorporate or be coupled to digital video processing circuitry configured to process image data in accordance with an H.26X (e.g., H.264/AVC) video coding standard.

The photodetector array 228 has a first surface 229a and a second surface 229b. According to some embodiments, an optical lens 226 is disposed between the second surface 225b of the up-converter array 224 and the first surface 229a of the photodetector array 228. The optical lens 226 is configured to direct the visible light emitted by the elements 224a of the up-converter array 224 to the array of photodetector elements 228a.

In some embodiments, a focal plane array (FPA), such as an infrared focal plan array (IRFPA), may be used instead of the photodetector array 228 and the optical lens 226. In general terms, an FPA comprises an array of light detectors positioned in the focal plane of an imaging system. Typically, a focal plane array comprises a rectangular two-dimensional array containing many thousands or even several million detectors. The detectors are typically photodetectors, such as photodiodes or photoconductive detectors, each of which can have dimensions between a few microns and a few tens of microns. Extremely sensitive and fast detection is achievable with arrays of Geiger-mode avalanche photodiodes (SPADs). Useful FPA technologies include polysilicon (e.g., low-temperature polycrystalline silicon (LTPS) such as LTPS-TFT), amorphous silicon, and organic photosensors, among others. Large-area electronics can be used for the focal plane array according to various embodiments, examples of which are disclosed in commonly owned U.S. Pat. Nos. 9,259,961; 8,077,235; and 7,125,495, all of which are incorporated herein by reference.

Figure 3:
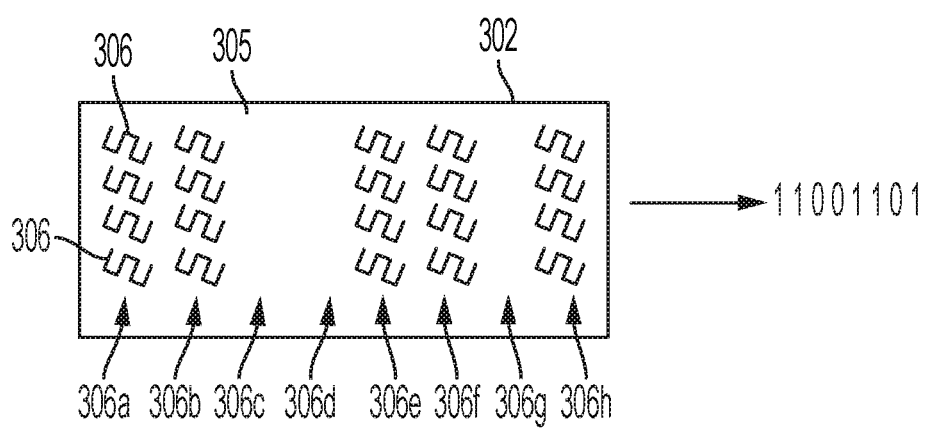
FIG. 3 illustrates a chipless RFID tag which can be detected by a mmW imaging system in accordance with any of the embodiments disclosed herein, the mmW imaging system further configured to decode information encoded in the RFID tag.

In accordance with some embodiments, the mmW imaging system 200 can be configured for use with a target 202 in the form of a chipless RFID tag, such as the chipless RFID tag 302 shown in FIG. 3. Chipless RFID is a wireless data capturing technique applying electromagnetic waves to extract data encoded in a tag. The chipless RFID tag 302 shown in FIG. 3 includes an arrangement of elements or glyphs 306. The glyphs 306 typically comprise a patterned conductive material disposed on a substrate 305 (e.g., a dielectric substrate). The glyphs 306 may be formed on a wide variety of substrates 305, e.g., paper, cardboard, a package, paper cup, a pallet, an article of clothing. The glyphs 306 may be fabricated from printed inks comprising a conductive material. In some implementations, the printed aches can include one or more of nickel, carbon, carbon nanotubes, and silver nanowires. The glyphs 306 can be fabricated by etching metal on a dielectric substrate 305. For example, the glyphs 306 can be fabricated by etching copper or aluminum. The glyphs 306 can be fabricated by etching a transparent conductor such as indium-tin oxide, for example. In some implementations, the glyphs 306 can be fabricated with a thermal transfer process using conductive ribbons of one or more of copper, aluminum, gold, and/or silver, for example.

In the embodiment shown in FIG. 3, the glyphs 306 are arranged to encode information spatially on the substrate 305 of the chipless RFID tag 302. The representative chipless RFID tag 302 shown in FIG. 3 includes n=8 columns, 306a-306h, and m=4 rows. The presence of a glyph 306 within a column may be used to encode a binary '1' value. The absence of a glyph 306 within a column may be used to encode a binary '0' value. In this illustrative example, the chipless RFID tag 302 encodes the 8-bit binary value '11001101'.

In accordance with various embodiments, mmW imaging system 200 includes a target detector 240 which is coupled to or incorporates a decoder 242. The target detector 240 and/or the decoder 242 can be implemented by a processor or processors of a type previously described. As was previously discussed, embodiments of the mmW imaging system 200 which are configured to detect and decode an RFID tag, such as the chipless RFID tag 302, can include or exclude the display 230. In some embodiments, the display 230 need not be a component of the mmW imaging system 200, but an external display (e.g., the same as or similar to display 230) can be operatively coupled to the mmW imaging system 200.

The mmW source 210 is configured to transmit mmW radiation at the chipless RFID tag 302, which may or may not be separated from, or enclosed by, a barrier 204 substantially non-transmissive to visible light. The mmW imaging device 220 is configured to receive backscatter radiation from the chipless RFID tag 302. The target detector 240 is configured to receive data produced by the photodetector array 228 via communication link 235. The target detector 240 is also configured to detect and image of the target 202 reconstructed by the up-converter array 224 and the photodetector array 228. The decoder 242, operatively coupled to the target detector 240, is configured to decode data encoded in the chipless RFID tag 302. In this representative example, the decoder 242 decodes the 8-bit binary value '11001101' encoded in the chipless RFID tag 302.

FIG. 4A illustrates a mmW imaging system 400a which includes a mmW source 410 and a mmW imaging device 420 in accordance with various embodiments. In the embodiment shown in FIG. 4A, the mmW source 410 is a component of the mmW imaging system 400a which is physically separate from the mmW imaging device 420. The mmW source 410 is contained within or supported by a housing 412, and the mmW imaging device 420 is contained within or supported by a housing 421. In some embodiments, one or both of the housings 410, 421 can be configured for portable, hand-held manipulation by the user. In other embodiments, one or both of the housings 410, 421 can be configured for mounting to a structure or machine via a coupling mechanism (see, e.g., mounting couplers 115, 103 shown in FIG. 1).

In accordance with various embodiments, the mmW source 410 can include an integral focusing lens 413 contained within or supported by the housing 412 of the mmW source 410. In other embodiments, the focusing lens 413 can be contained within or supported by a separate housing 415, which can be mechanically coupled to (or positioned proximate to) the housing 412 and optically coupled to the mmW source 410. As discussed previously, the focusing lens 413 can be an optional component of the mmW source 410.

In accordance with various embodiments, the mmW imaging device 420 can include an integral focusing lens 422 contained within or supported by the housing 421 of the mmW imaging device 420. In other embodiments, the focusing lens 422 is contained within or supported by a separate housing 423, which can be mechanically coupled to (or positioned proximate to) the housing 421 and optically coupled to the mmW imaging device 420.

According to a first embodiment, the mmW imaging device 420 includes at least an up-converting array 424 and a photo detector array 428 packaged within housing 421 to collectively define an integrated optical-to-electrical converter. In a second embodiment, the mmW imaging device 420 includes at least the focusing lens 422, the up-converting array 424, and the photo detector array 428 packaged within housing 421 to collectively define an integrated optical-to-electrical converter. In a third embodiment, the mmW imaging device 420 includes at least the focusing lens 422, the up-converting array 424, an optical lens 426, and the photo detector array 428 packaged within housing 421 to collectively define an integrated optical-to-electrical converter. According to other embodiments, any of the first embodiment, the second embodiment, and the third embodiment can further include a display 430 within the housing 421 to collectively define an integrated optical-to-electrical converter and display device. Any of these embodiments can further include a target detector and/or a decoder configured to detect a chipless RFID tag and decode information encoded in the chipless RFID tag (see, e.g., target detector 240 and decoder 242 shown in FIG. 2A).

FIG. 4B illustrates a mmW imaging system 400b which includes a mmW source 410 and a mmW imaging device 420 in accordance with various embodiments. In the embodiment shown in FIG. 4B, the mmW source 410 and the mmW imaging device 420 are integral components of the mmW imaging system 400b contained within or supported by a common housing 425. In some embodiments, the housing 425 can be configured for portable, hand-held manipulation by the user. In other embodiments, the housing 425 can be configured for mounting to a structure or machine via a coupling mechanism (see, e.g., mounting coupler 103 shown in FIG. 1).

In accordance with various embodiments, the mmW source 410 can include an integral focusing lens 413 contained within or supported by the housing 425 of the mmW imaging system 400b. In other embodiments, the focusing lens 413 can be contained within or supported by a separate housing 415, which can be mechanically coupled to (or positioned proximate to) the housing 425 and optically coupled to the mmW source 410. As discussed previously, the focusing lens 413 can be an optional component of the mmW imaging system 400b.

In accordance with various embodiments, the mmW imaging device 420 can include an integral focusing lens 422 contained within or supported by the housing 425 of the mmW imaging system 400b. In other embodiments, the focusing lens 422 is contained within or supported by a separate housing 423, which can be mechanically coupled to (or positioned proximate to) the housing 425 and optically coupled to the mmW imaging device 420. In accordance with some embodiments, the mmW imaging device 420 shown in FIG. 4B can include a target detector and/or a decoder configured to detect a chipless RFID tag and decode information encoded in the chipless RFID tag (see, e.g., target detector 240 and decoder 242 shown in FIG. 2A). The target detector and/or a decoder can be contained within or supported by the housing 425 (or a separate housing).

Figure 5:
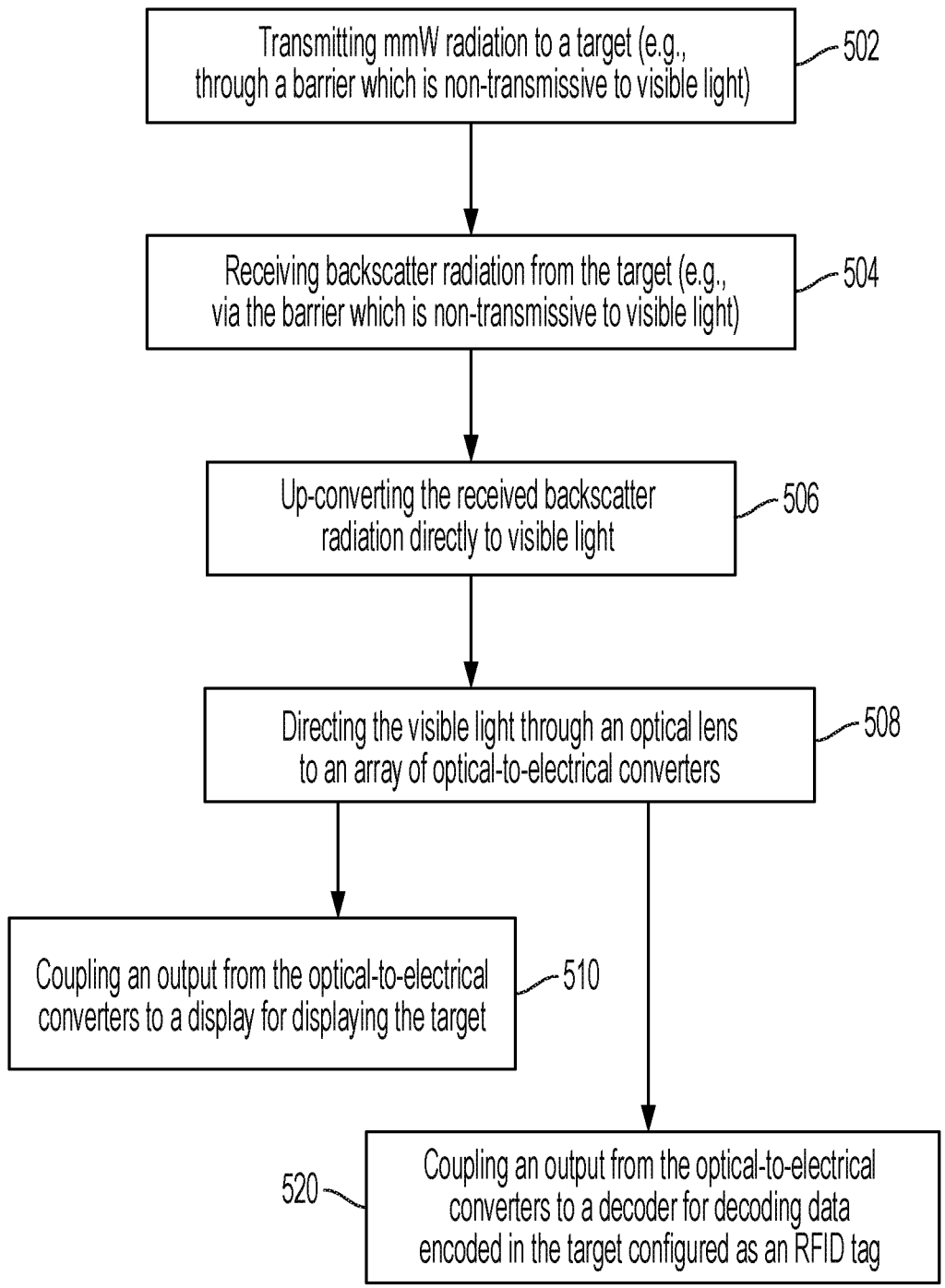
FIG. 5 is a method implemented by a mmW imaging system in accordance with any of the embodiments disclosure herein.

FIG. 5 is a method implemented by a mmW imaging system in accordance with any of the embodiments disclosure herein. The method shown in FIG. 5 involves transmitting 502 mmW radiation to a target. Transmitting 502 mmW radiation to the target may involve collimating the transmitted mmW radiation (e.g., via a focusing lens). In some embodiments, the method involves transmitting mmW radiation through a barrier which is substantially non-transmissive to visible light prior to impinging on the target. The method involves receiving 504 backscatter radiation from the target. In some embodiments, the method involves receiving backscatter radiation from the target after passing through a barrier which is substantially non-transmissive to visible light. Receiving 504 backscatter radiation from the target may involve collimating the received backscatter radiation (e.g., via a focusing lens).

The method also involves up-converting 506 the received backscatter radiation (which may be collimated) directly to visible light. The method involves directing 508 the visible light (e.g., through an optional optical lens) to an array of optical-to-electrical converters. In some embodiments, the method involves coupling 510 an output from the optical-to-electrical converters to a display for displaying the target. In other embodiments, the method involves coupling 520 an output from the optical-to-electrical converters to a decoder for decoding data encoded in the target configured as an RFID tag (e.g., a chipless RFID tag). In further embodiments, the method involves the coupling steps of blocks 510 and 520.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "operatively coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably operatively coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A millimeter-wave (mmW) imaging system, comprising:
   a mmW source configured to transmit mmW radiation to a target; and
   a mmW imaging device comprising:
      an array of up-converter elements configured to convert backscatter radiation received from the target directly to visible light, the up-converter array having a first surface and a second surface;
      a first focusing lens optically coupled to the first surface of the up-converter array and configured to direct backscatter radiation received from the target to the up-converter elements;
      an array of photodetectors, the photodetector array having a first surface and a second surface, the first surface of the photodetector array configured to receive visible light emitted by the up-converter elements, and the photodetector array configured to produce electrical signals indicative of an optical image of the target;
      an optical lens disposed between the second surface of the up-converter array and the first surface of the photodetector array, the optical lens configured to direct light emitted by the up-converter array to the array of photodetectors;
      a display comprising an array of display pixels coupled to the array of photodetectors, the display configured to convert electrical signals produced by the array of photodetectors to an optical image of the target;
      a decoder coupled to the array of photodetectors, the decoder configured to decode data encoded in the target configured as an RFID tag; and
   a housing configured for portability and hand-held manipulation by a user, the housing dimensioned to house at least the mmW imaging device, wherein the up-converter array, the first focusing lens, the photodetector array, the optical lens, and the display are axially aligned with one another along a common axis in the housing.

2. The system of claim 1, wherein the first focusing lens comprises a dielectric lens or a metamaterial lens.

3. The system of claim 1, comprising a second focusing lens disposed at or proximate the mmW source and configured to direct the mmW radiation at the target.

4. The system of claim 3, wherein the second focusing lens comprises a dielectric lens or a metamaterial lens.

5. The system of claim 1, wherein at least the up-converter array and the photodetector array are packaged to define an integrated optical-to-electrical converter.

6. The system of claim 1, wherein at least the up-converter array, the optical lens, and the photodetector array are packaged to define an integrated optical-to-electrical converter.

7. The system of claim 1, wherein:
   the mmW source is disposed in a first housing; and
   the first housing is physically separable from the housing dimensioned to house at least the mmW imaging device.

8. The system of claim 1, wherein the mmW source, is disposed in or supported by the housing dimensioned to house at least the mmW imaging device.

9. The system of claim 1, wherein the display is configured to produce motion video.

10. The system of claim 1, wherein:
    the target comprises a chipless RFID tag; and
    the decoder is configured to decode data encoded in the chipless RFID tag.

11. The system of claim 1, wherein the mmW imaging system is configured to image the target through a barrier which is substantially non-transmissive to visible light.

12. A millimeter-wave (mmW) imaging system, comprising:
    a mmW source configured to transmit mmW radiation to a target; and
    a mmW imaging device comprising:
       a glow discharge device (GDD) comprising an array of GDD pixels, the glow discharge device having a first surface and a second surface;
       a first focusing lens disposed at or proximate the first surface of the glow discharge device and configured to direct backscatter radiation received from the target to the GDD pixels;
       an array of photodetectors, the photodetector array having a first surface and a second surface;
       an optical lens disposed between the second surface of the GDD and the first surface of the photodetector array, the optical lens configured to direct light emitted by the GDD pixels to the array of photodetectors;
       a display comprising an array of display pixels coupled to the array of photodetectors, the display configured to convert electrical signals produced by the array of photodetectors to an optical image of the target; and
       a decoder coupled to the array of photodetectors, the decoder configured to decode data encoded in the target configured as an RFID tag; and
    a housing configured for portability and hand-held manipulation by a user, the housing dimensioned to house the mmW imaging device and the mmW source, wherein the glow discharge device, the first focusing lens, the photodetector array, the optical lens, and the display are axially aligned with one another along a common axis in the housing.

13. The system of claim 12, wherein:
    at least the glow discharge device, the optical lens, the photodetector array, and the display are packaged to define an integrated optical-to-electrical converter.

14. The system of claim 12, wherein the display is configured to produce motion video.

15. The system of claim 12, wherein the mmW imaging system is configured to image the target through a barrier which is substantially non-transmissive to visible light.

* * * * *